US007781095B2

(12) United States Patent
Cho et al.

(10) Patent No.: US 7,781,095 B2
(45) Date of Patent: Aug. 24, 2010

(54) RECHARGEABLE BATTERY HAVING CURRENT COLLECTING PLATES COUPLED WITH UNCOATED REGIONS OF ELECTRODES

(75) Inventors: Kyu-Woong Cho, Suwon-si (KR); Hong-Sup Lim, Suwon-si (KR)

(73) Assignee: Samsung SDI Co., Ltd., Suwon (KR)

( * ) Notice: Subject to any disclaimer, the term of this patent is extended or adjusted under 35 U.S.C. 154(b) by 977 days.

(21) Appl. No.: 11/156,601

(22) Filed: Jun. 21, 2005

(65) Prior Publication Data

US 2005/0287429 A1   Dec. 29, 2005

(30) Foreign Application Priority Data

Jun. 23, 2004   (KR) .................. 10-2004-0047015

(51) Int. Cl.
  H01M 2/28 (2006.01)
  H01M 2/08 (2006.01)
(52) U.S. Cl. .................. 429/161; 429/175; 429/211; 429/176; 429/185
(58) Field of Classification Search .............. 429/161, 429/176, 181, 211, 94, 233, 163, 164, 234, 429/237, 209, 178, 185, 175
See application file for complete search history.

(56) References Cited

U.S. PATENT DOCUMENTS

2004/0247998 A1* 12/2004 Nakanishi et al. .......... 429/161

FOREIGN PATENT DOCUMENTS

| CN | 1283879 | 2/2001 |
|---|---|---|
| EP | 1076371 A1 | 2/2001 |
| JP | 5717067 | 1/1982 |
| JP | 02148565 | 6/1990 |
| JP | 6-267528 | 9/1994 |
| JP | 2000-040501 | 2/2000 |
| JP | 2000150306 | 5/2000 |
| JP | 2001-093579 | 4/2001 |
| JP | 2001176494 | 6/2001 |
| JP | 2001-229356 | 8/2001 |
| KR | 10-2001-0092272 | 10/2001 |

* cited by examiner

Primary Examiner—Raymond Alejandro
(74) Attorney, Agent, or Firm—H.C. Park & Associates, PLC

(57) ABSTRACT

A rechargeable battery includes an electrode assembly comprising a positive electrode that has an uncoated region that is not coated with an active material along an edge, a negative electrode that has an uncoated region that is not coated with an active material along an edge, and a separator that is placed between the positive electrode and the negative electrode. The battery further comprises current collecting plates that are joined with the uncoated regions of the positive electrode and negative electrode while covering the uncoated regions, a case for housing the electrode assembly and the current collecting plates, and a cap assembly that is coupled with the case to seal it and includes terminals that are coupled with the current collecting plates.

7 Claims, 4 Drawing Sheets

RECHARGEABLE BATTERY HAVING CURRENT COLLECTING PLATES COUPLED WITH UNCOATED REGIONS OF ELECTRODES

CROSS REFERENCE TO RELATED APPLICATION

This application claims priority to and the benefit of Korean patent application No. 10-2004-0047015 filed in the Korean Intellectual Property Office on Jun. 23, 2004, the entire disclosure of which is incorporated herein by reference.

BACKGROUND OF THE INVENTION

1. Field of the Invention

The present invention relates to a rechargeable battery that has improved current collecting efficiency.

2. Background of the Invention

Unlike a nonrechargeable battery that may not be recharged, a rechargeable battery may be charged and discharged repeatedly. A lithium rechargeable battery may be packaged into a pack shape to be used as a power source for various portable electronic devices such as cellular phones, laptop computers, and camcorders.

Recently, rechargeable batteries with high power storage capacity have been developed for use as power sources for driving motors such as those in hybrid automobiles.

These rechargeable batteries may be fabricated into various shapes such as cylindrical and rectangular box shapes in which an electrode assembly comprising positive electrode sheets, negative electrode sheets, and a separator that is interposed between the electrode sheets is wound (as a jelly roll) and inserted into a case. The case is mounted with a cap assembly that is formed with outer terminals to provide a battery.

An electrode assembly includes leads at the positive electrode and the negative electrode to collect current that is generated at the positive electrode and the negative electrode during the cell operation. The leads are connected to external terminals to which the current is supplied.

This structure may provide sufficient current collection efficiency in a small-sized battery that has a low power storage capacity. However, a structure that collects current using leads is inefficient in a large-size battery that requires high power output. For example, the sizes of the positive electrode and the negative electrode increase in proportion to the size of the battery as do the resistances of a larger-sized positive electrode and negative electrode. In addition, the above-described structure has difficulty in evenly outputting the current that is generated in every part of the electrode assembly when it is used in the large-sized battery.

To resolve these problems, Japanese Patent Laid-Open No. Hei 06-267528 discloses a rechargeable battery that is manufactured by forming lead adhesion regions that are not coated with an active material at one end of current collectors of the band-type positive and negative electrodes. The lead adhesion regions protrude higher than the separator when an electrode assembly is formed by winding the positive electrode, the negative electrode and the separator. A plurality of positive electrode leads and negative electrode leads are coupled to the lead adhesion regions.

Since a conventional rechargeable battery may attach a plurality of lease in the lead adhesion regions, it can have an increased current collecting efficiency by reducing internal resistance of the battery and collecting current from the positive electrode and the negative electrode. This rechargeable battery is difficult to manufacture because a plurality of leads are fixed in the lead adhesion region. Also, since an active material is not present inside the cell, the capacity of the portion that does not participate in the reaction, that is, the portion occupied by the lead adhesion regions and the leads, becomes large, which makes it hard to form a large-size high-power battery.

Japanese Patent Laid-Open No. 2000-40501 discloses a structure where terminals are connected to projecting ends of an electrode assembly that are not coated with an active material. The technology, however, cannot maximize the current collecting efficiency because the contact area of the unit that substantially connects the projecting ends to the terminals electrically is restrictive.

SUMMARY OF THE INVENTION

The present invention provides a rechargeable battery that has an improved current collecting efficiency to enhance power output performance and evenly output the current that is generated in every part of an electrode assembly.

Additional features of the invention will be set forth in the description which follows, and in part will be apparent from the description, or may be learned by practice of the invention.

The present invention discloses a rechargeable battery that comprises an electrode assembly including a positive electrode having an uncoated region that is not coated with an active material along an edge, a negative electrode having an uncoated region that is not coated with an active material along an edge, and a separator that is placed between the positive electrode and the negative electrode. The battery further comprises current collecting plates that are coupled with uncoated regions of the positive electrode and negative electrode while covering the uncoated regions and a case for housing the electrode assembly and the current collecting plates. In addition, a cap assembly is coupled with the case to seal the case and the terminals that are coupled with the current collecting plates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

A rechargeable battery comprising the current collecting plates of the present invention may maximize the contact area of the current collecting plates to the uncoated regions of the electrode assembly, thus improving the current collecting efficiency. In addition, the battery may evenly output the current that is generated in every part of the electrode assembly.

The rechargeable battery of the present invention may be used as an energy source a motor for hybrid electric vehicles (HEV), electric vehicles (EV), wireless appliances, motorcycles, motor scooters and the like which require high power performance and large capacity.

Figure 1:
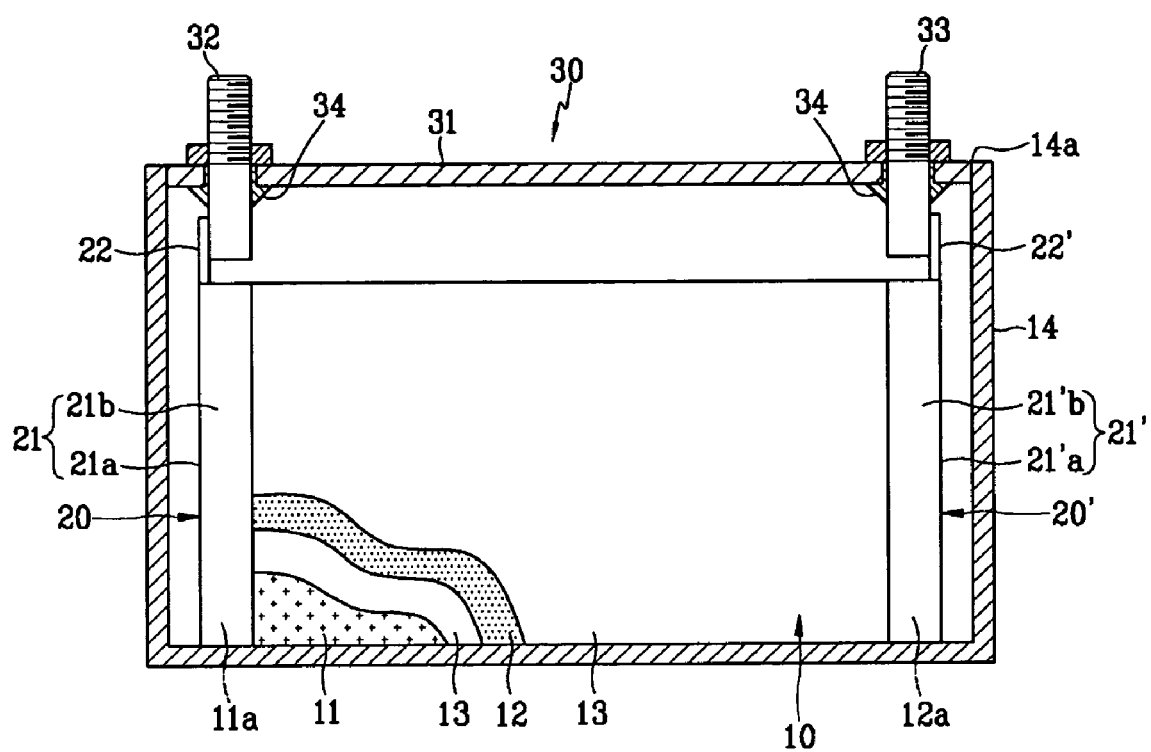
FIG. 1 is a cross-sectional view of a rechargeable battery in accordance with an exemplary embodiment of the present invention.

FIG. 1 is a cross-sectional view of a rechargeable battery according to an exemplary embodiment of the present invention. As shown in FIG. 1, the rechargeable battery includes an electrode assembly 10 that is formed by stacking a band-type positive electrode 11 and a band-type negative electrode 12 with a separator 13 interposed between them and winding them in a jellyroll form. The battery further comprises a polygonal case 14 that has an opening 14a on one side and a space for housing the electrode assembly 10 inside, and a cap assembly that is joined with the opening 14a of the case 14 to seal it and has a positive terminal 32 and a negative terminal 33 that are coupled with the electrode assembly 10. In addition, the battery comprises current collecting plates 20 and 20' that cover and are fixed to an uncoated region 11a of a positive electrode and an uncoated region 12a of the negative electrode of the electrode assembly 10, and are coupled with the positive terminal 32 and the negative terminal 33.

The case 14 may comprise a conductive metal, such as aluminum, an aluminum alloy, or nickel-plated steel. The case 14 may be in the shape of hexahedron or any other shape that has an internal space for housing the electrode assembly 10.

The cap assembly 20 includes a cap plate 31 that is joined with the opening 14a of the case 14 in an airtight manner to seal the case 14. The cap assembly 30 also includes a positive terminal 32 and a negative terminal 33 that are positioned on both sides of the cap plate 31 and are coupled with an uncoated region 11a of the positive electrode and an uncoated region 12a of the negative electrode, respectively, through the current collecting plates 20 and 20'.

Insulators 34 and 34' may be placed between the cap plate 31 and the positive terminal 32 and the negative terminal 33 respectively, to insulate the cap plate 31 from the positive and negative terminals 32 and 33.

The electrode assembly 10 is formed by stacking the positive electrode 11 and the negative electrode 12 that have current collectors that are coated with an active material with the separator 13 in between them and winding them to form a jellyroll. The electrode assembly of the present invention may be formed by stacking the positive electrode and the negative electrode in multiple layers with the separator interposed between them.

A positive electrode active material and a negative electrode active material coat a positive electrode current collector and a negative electrode current collector. The uncoated region 11a of the positive electrode and the uncoated region 12a of negative electrode may be positioned to face each other in multiple layers. Herein, the uncoated region 11a of the positive electrode and the uncoated region 12a of the negative electrode are portions that do not have an active material coated along the edge in a side parallel to the longitudinal direction of current collectors. The uncoated regions 11a and 12a may be formed to be protruded higher than the separator 13.

Figure 2:
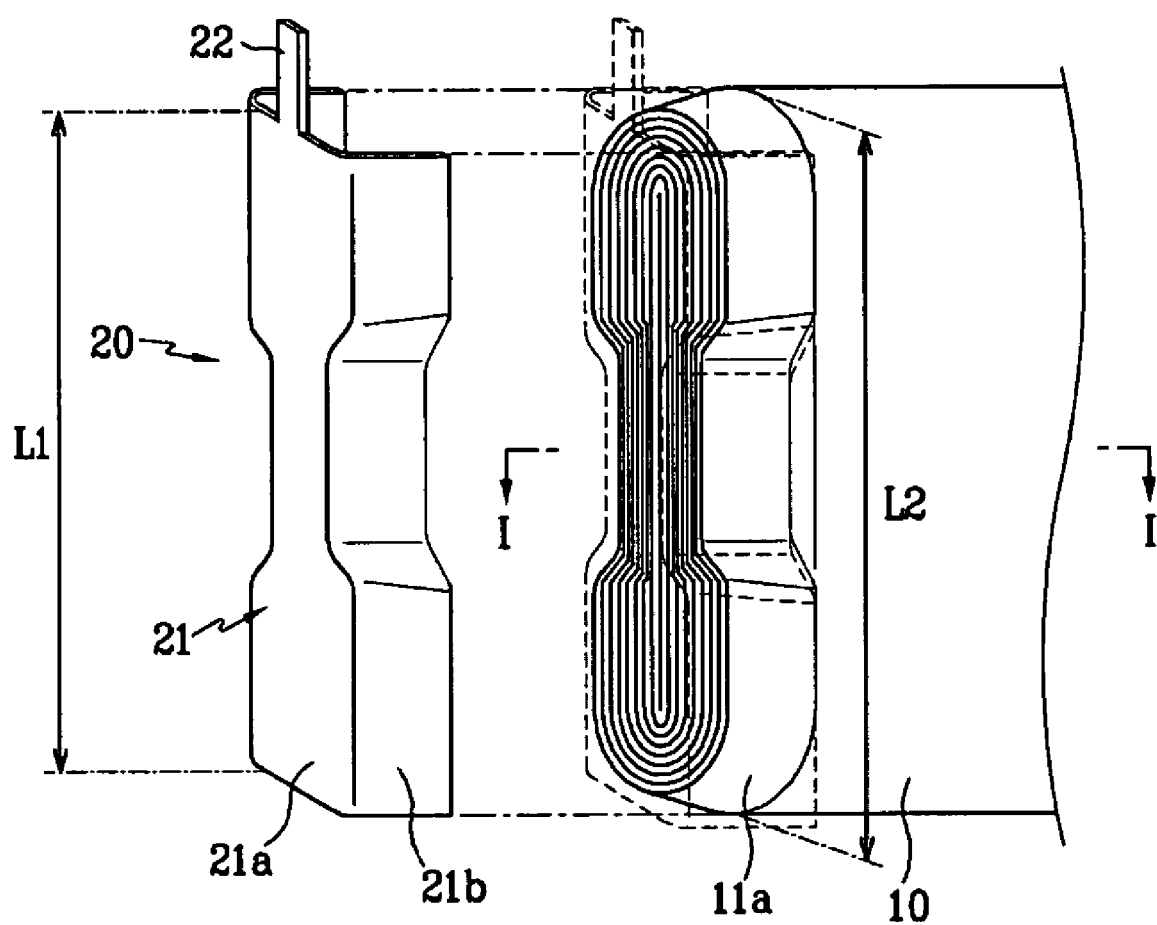
FIG. 2 is a perspective view of an electrode assembly coupled with a current collecting plate in accordance with an exemplary embodiment of the present invention.

In the rechargeable battery having the above-described structure of the present embodiment, the current collecting plates 20 and 20' cover the uncoated regions 11a and 12a, respectively, are placed at both ends of the electrode assembly 10, and are fixed thereon by welding, as shown in FIG. 2. Since the current collecting plates 20 and 20' have the same structure in the present embodiment, only the current collecting plate 20 connected to the uncoated region 11a of the positive electrode is illustrated in FIG. 2. Hereafter, the other current collecting plate 20' will be described by describing the current collecting plate 20 shown in FIG. 2.

The current collecting plates 20 and 20' of the present embodiment include covers 21 and 21' that cover the uncoated region 11a of the positive electrode and the uncoated region 12a of the negative electrode, respectively, and are fixed to the uncoated regions 11a of the positive electrode and the uncoated region 12a of the negative electrode, and connectors 22 and 22' which are integrally formed to extend from the center of the upper parts of the covers 21 and 21' and are coupled with the terminals 32 and 33.

The current collecting plates 20 and 20' may have a length (L1) similar to the length (L2) of the uncoated regions 11a and 12a of the electrode assembly 10 and are wide enough to cover the uncoated regions 11a and 12a.

In the present embodiment, the covers 21 and 21' of the current collecting plates 20 and 20' include first covers 21a and 21'a respectively, that tightly contact and cover the entire line end of the uncoated regions 11a and 12a. Second covers 21b and 21'b are bent at both ends of the first covers 21a and 21'a, respectively to tightly contact and cover the circumference of the uncoated regions 11a and 12a.

Figure 3:
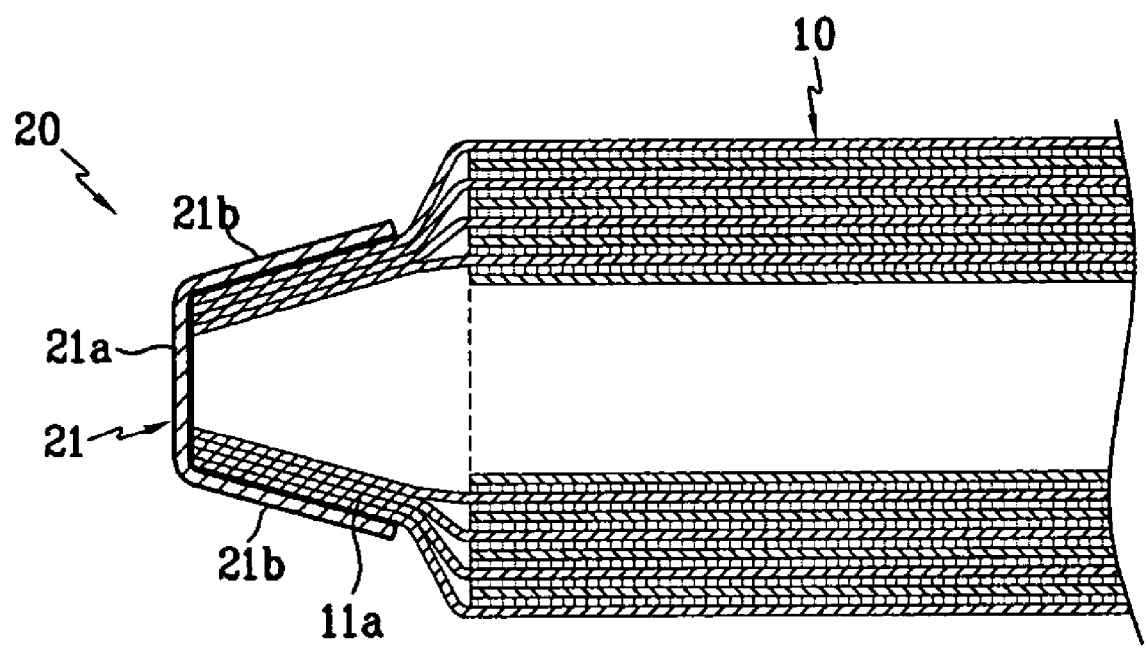
FIG. 3 is a cross-sectional view of the electrode assembly of FIG. 2 along a line I-I.

Referring to FIG. 3, the current collecting plates 20 and 20' are coupled with the uncoated regions 11a and 12a so that the internal sides of the covers 21 and 21' tightly contact and cover the front side and circumference of the uncoated regions 11a and 12a.

In the present embodiment, the shape of current collecting plates 20 and 20' corresponds to the external shape of the uncoated regions 11a and 12a. The shape of the current collecting plates 20 and 20' is not limited to a specific shape. The current collecting plates 20 and 20' may be formed in any shape as long as they may tightly contact and cover the front side of the uncoated regions 11a and 12a.

Figure 4:
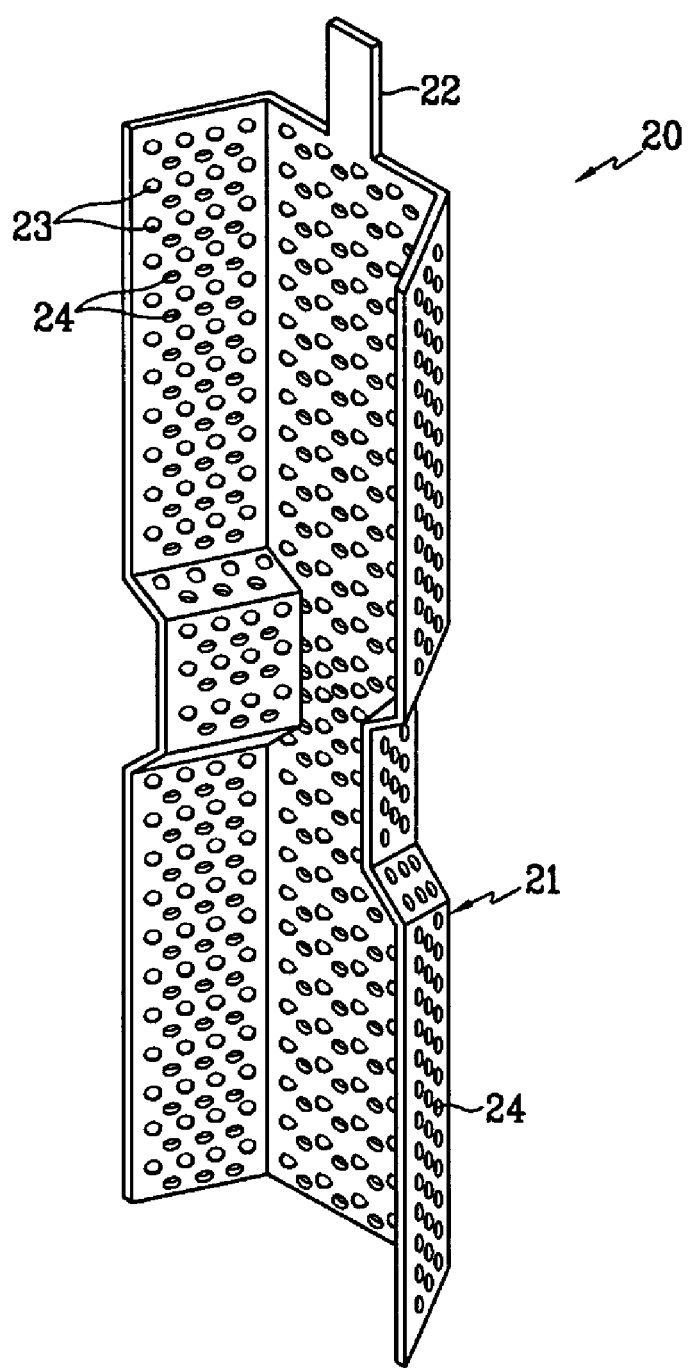
FIG. 4 is a perspective view of a current collecting plate in accordance with another exemplary embodiment of the present invention.

The current collecting plates 20 and 20' may be fixed to the uncoated regions 11a and 12a by welding. As illustrated in FIG. 4, when a plurality of protrusions 23 are formed on a side of the current collecting plates 20 and 20' that contacts the uncoated regions 11a and 12a, the protrusions 23 fit into the uncoated regions 11a and 12a and tightly contact the uncoated regions 11a and 12a. Thus, the current collecting plates 20 and 20' contact the uncoated regions 11a and 12a more tightly which makes the coupling between the current collecting plates 20 and 20' and the uncoated regions 11a and 12a, which are fixed by welding, even stronger.

The welding may be carried out by a resistant welding, ultrasonic welding, or laser welding.

The current collecting plates 20 and 20' may further comprise a plurality of openings 24 for electrolyte impregnation as shown in FIG. 4.

These electrolyte impregnation openings 24 allow an electrolyte to flow in and impregnate the uncoated regions 11a and 12a of the electrode assembly 10, even though the uncoated regions 11a and 12a are covered with the current collecting plates 20 and 20'. The size and the number of the electrolyte impregnation openings 24 are not limited specifically and can be determined flexibly based on the size of the rechargeable battery, etc.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A rechargeable battery, comprising:
    an electrode assembly comprising a positive electrode, a negative electrode, and a separator that is placed between the positive electrode and the negative electrode, each of the positive electrode and the negative electrode comprising a first surface having a first region coated with an active material and a second region that is uncoated with the active material, the second region being arranged along edges of the first surface;
    current collecting plates that are joined with and cover portions of the second regions of the positive electrode and the negative electrode, respectively;
    a case to house the electrode assembly and the current collecting plates; and
    a cap assembly that is joined with the case and includes terminals that are coupled with the current collecting plates,
    wherein each current collecting plate comprises a cover including a first cover and a second cover formed to be bent at ends of the first cover,
    wherein an edge of each uncoated region faces the first cover,
    wherein the first cover physically contacts the entire edge of each uncoated region, and
    wherein the second cover physically contacts a surface of the second regions of the first surface wherein each cover comprises a plurality of protrusions on a side that contacts the second region; and wherein each over comprises a plurality of openings.

2. The rechargeable battery of claim 1,
    wherein each current collecting plate further comprises a connector that extends from the cover and is coupled with the terminal.

3. The rechargeable battery of claim 2,
    wherein each cover has a shape that corresponds to a shape of a cross-section of the electrode assembly.

4. The rechargeable battery of claim 3,
    wherein the uncoated regions of the positive electrode and negative electrode face each other.

5. The rechargeable battery of claim 1,
    wherein the electrode assembly is formed as a jelly roll.

6. The rechargeable battery of claim 1,
    wherein the rechargeable battery is in the shape of a rectangular box battery.

7. The rechargeable battery of claim 1,
    wherein the rechargeable battery drives a motor.

* * * * *